(12) United States Patent
Sugaki et al.

(10) Patent No.: US 10,108,072 B1
(45) Date of Patent: Oct. 23, 2018

(54) UNDERWATER IMAGE CAPTURING APPARATUS

(71) Applicant: PRODRONE CO., LTD., Nagoya-shi, Aichi (JP)

(72) Inventors: Kiyokazu Sugaki, Nagoya (JP); Kazuo Ichihara, Nagoya (JP)

(73) Assignee: PRODRONE CO., LTD., Nagoya-shi (JP)

( * ) Notice: Subject to any disclaimer, the term of this patent is extended or adjusted under 35 U.S.C. 154(b) by 0 days.

(21) Appl. No.: 15/764,290

(22) PCT Filed: Oct. 7, 2016

(86) PCT No.: PCT/JP2016/079951
§ 371 (c)(1),
(2) Date: Mar. 28, 2018

(87) PCT Pub. No.: WO2017/073300
PCT Pub. Date: May 4, 2017

(30) Foreign Application Priority Data

Oct. 26, 2015 (JP) .................................. 2015-209619

(51) Int. Cl.
*G03B 15/00* (2006.01)
*G03B 17/56* (2006.01)
(Continued)

(52) U.S. Cl.
CPC ............ *G03B 15/006* (2013.01); *B64C 27/08* (2013.01); *B64C 39/024* (2013.01); *G03B 17/08* (2013.01);
(Continued)

(58) Field of Classification Search
None
See application file for complete search history.

(56) References Cited

U.S. PATENT DOCUMENTS 5,778,259 A * 7/1998 Rink .................... H04N 5/2252
206/316.2
2005/0200699 A1 9/2005 Kim
(Continued)

FOREIGN PATENT DOCUMENTS

JP S63-97965 U 6/1988
JP H11-119314 A 4/1999
(Continued)

OTHER PUBLICATIONS

Dec. 20, 2016 International Search Report issued in International Patent Application No. PCT/JP2016/079951.
(Continued)

*Primary Examiner* — William Perkey
(74) *Attorney, Agent, or Firm* — Oliff PLC

(57) ABSTRACT

To make it possible to control an image capturing position and its direction in water easily and flexibly through the use of a miniature unmanned aerial vehicle equipped with a plurality of rotors. This is solved by an underwater image capturing apparatus including a miniature unmanned aerial vehicle equipped with a plurality of rotors, a winding machine capable of delivering and winding a string-like member, and an underwater camera capable of capturing images in water, wherein the winding machine is fixed to the miniature unmanned aerial vehicle and the string-like member is connected to the underwater camera.

13 Claims, 12 Drawing Sheets

(51) Int. Cl.
    *G03B 17/08*    (2006.01)
    *B64C 27/08*    (2006.01)
    *B64C 39/02*    (2006.01)

(52) U.S. Cl.
    CPC ...... *G03B 17/561* (2013.01); *B64C 2201/024* (2013.01); *B64C 2201/127* (2013.01)

(56) References Cited

U.S. PATENT DOCUMENTS

| | | | |
|---|---|---|---|
| 2006/0216007 A1* | 9/2006 | Moreb | A01K 97/00 396/25 |
| 2011/0006153 A1 | 1/2011 | Silansky et al. | |
| 2015/0158587 A1* | 6/2015 | Patrick | B64C 39/024 244/137.4 |
| 2015/0342169 A1* | 12/2015 | Zeevi | A01K 63/04 43/4.5 |
| 2016/0119065 A1* | 4/2016 | Tobias | G03B 17/08 348/81 |
| 2017/0328814 A1* | 11/2017 | Castendyk | B64C 39/024 |
| 2018/0063429 A1* | 3/2018 | Enriquez | H04N 5/23238 |
| 2018/0107210 A1* | 4/2018 | Harnett | G05D 1/0038 |

FOREIGN PATENT DOCUMENTS

| | | | | |
|---|---|---|---|---|
| JP | 2000-047294 A | | 2/2000 | |
| JP | 2005-528774 A | | 9/2005 | |
| JP | 2006-224863 A | | 8/2006 | |
| JP | 2009-514268 A | | 4/2009 | |
| JP | 2009-196503 A | | 9/2009 | |
| JP | 2012-98412 A | | 5/2012 | |
| JP | WO 2017/094635 A1 * | | 6/2017 | ............ B63C 11/00 |

OTHER PUBLICATIONS

Sep. 5, 2017 Office Action issued in Japanese Patent Application No. 2015-209619.

* cited by examiner

UNDERWATER IMAGE CAPTURING APPARATUS

TECHNICAL FIELD

The present invention relates to an underwater image capturing apparatus and, more particularly, to a technology that controls the position and orientation of an underwater camera using a miniature unmanned aerial vehicle equipped with a plurality of rotors.

BACKGROUND ART

Conventionally, miniature unmanned aerial vehicles (UAVs) which are typified by unmanned helicopters for industrial use have been expensive and hard to obtain and manipulative skills have been needed to make them fly stably. Recently, however, UAV maneuverability has improved dramatically because an acceleration sensor, an angular velocity sensor, etc. which have high performance and are easy to handle have become available at reasonable prices, and also, many operations to control the UAV airframe have been automated. Against this background, attempts are now made to apply, especially, miniature multicopters to diverse missions in a wide range of fields, not only for hobby purposes.

A multicopter is one type of a helicopter having a plurality or rotors installed thereon, and it flies while keeping balance by adjusting the rotational rate of each of these rotors. Unlike a helicopter, a multicopter has a simplified structure, and therefore, the multicopter is easy to maintain and its airframe can be built at comparatively low cost.

CITATION LIST

Patent Literature

PTL1: JP 2006-224863 A

SUMMARY OF INVENTION

Technical Problem

The aforementioned PTL1 discloses an underwater vehicle which is equipped with an underwater camera and a plurality of thrusters and performs attitude control in water through a triaxial acceleration sensor and a triaxial angular acceleration sensor.

Since the above underwater vehicle controls the vehicle position and attitude using the acceleration sensor and angular acceleration sensor, the vehicle is presumed to control the direction and distance to move from its current position and attitude as a starting point in response to a command from its manipulator. That is, once offset occurs in its position and attitude, the underwater vehicle of PTL1 is thought to be unable to make corrections autonomously, such as returning to its original position, restoring its attitude to be horizontal, and reorienting the camera toward an image capturing direction. Therefore, the manipulator always has to manipulate the above underwater vehicle interactively, while viewing images captured by the camera.

In addition, in the case of manipulating the vehicle immersed in water by radio communication, electromagnetic waves significantly attenuate through a conductor such as water and, therefore, communication can only be performed across a short distance of several meters even if a decrease is made in the frequency of electromagnetic waves to be used for communication. Hence, it is hard to manipulate the above underwater vehicle stably by radio communication; probably for this reason, the above underwater vehicle is manipulated by wired communication according to its embodiment. Since a terminal for the manipulator and the underwater vehicle are connected by wire, a range in which the underwater vehicle moves is restricted within a cable length range.

Furthermore, for instance, considering a case where a miniature unmanned aerial vehicle is made to land on a water surface and images in water are captured by an underwater camera installed on the airframe, manipulative skills are needed to manipulate the vehicle even if the vehicle lands on a still water surface; additionally, changing the image capturing position and direction after landing on the water surface becomes complicated. Moreover, such miniature unmanned aerial vehicle can only capture images in front of its airframe or in a direction from the airframe position as a starting point.

In consideration of the problems noted above, a problem to be solved by the present invention resides in making it possible to control the image capturing position and direction in water easily and flexibly through the use of a miniature unmanned aerial vehicle equipped with a plurality of rotors.

Solution to Problem

To solve the foregoing problem, an underwater image capturing apparatus of the present invention includes a miniature unmanned aerial vehicle equipped with a plurality of rotors and an underwater camera capable of capturing images in water, wherein the underwater camera and the miniature unmanned aerial vehicle are connected by a string-like member.

With the miniature unmanned aerial vehicle with high maneuverability, the underwater camera is manipulated from above; this makes it possible to capture images in water in a site far from the manipulator and also to control the position and orientation of the underwater camera in water easily and flexibly.

It is also preferable that the apparatus further includes a winding machine capable of delivering and winding the string-like member, wherein the winding machine is fixed to the miniature unmanned aerial vehicle.

Since the miniature unmanned aerial vehicle is equipped with the winding machine, flying stability is enhanced by winding up the string-like member when the vehicle is moving from a takeoff and landing port to a spot where image capturing is performed, and it becomes easy to adjust depth at which the underwater camera should be positioned when image capturing is performed.

It is al so preferable that the miniature unmanned aerial vehicle is equipped with a GPS and a direction sensor.

Since the miniature unmanned aerial vehicle is equipped with the GPS and the direction sensor, it is possible to specify a position and an orientation of the miniature unmanned aerial vehicle using latitude/longitude which is an absolute guidepost and a direction. This makes it unnecessary for the manipulator to adjust the position and orientation of the miniature unmanned aerial vehicle while tracking the vehicle visually, and therefore, it becomes possible to place the miniature unmanned aerial vehicle and the underwater camera in a desired position and an orientation with minimum necessary manipulation and it also becomes possible to automatically maintain a state that they are placed.

It is also preferable that the string-like member is adapted to serve also as a signal line for transmitting and receiving a signal between the miniature unmanned aerial vehicle and the underwater camera.

The miniature unmanned aerial vehicle and the underwater camera are connected by the signal line and this makes it possible for the manipulator to manipulate the underwater camera through wireless communication with the miniature unmanned aerial vehicle and likewise to receive image information captured by the underwater camera through wireless communication with the miniature unmanned aerial vehicle.

In addition, a configuration may be such that the string-like member is adapted to serve also as a feeder for supplying power from the miniature unmanned aerial vehicle to the underwater camera.

Power consumed by the underwater camera is generally smaller as compared with power consumed by the miniature unmanned aerial vehicle, and it is possible to supply sufficient power even with a feeder having a small wire diameter. Consequently, it becomes unnecessary to install a separate battery in the underwater camera; for example, such an accident can be obviated that image capturing is stopped by a human error, inter alia, a battery being charged or installed in the underwater camera.

It is also preferable that the apparatus further includes a manipulator terminal capable of wireless communication with the miniature unmanned aerial vehicle, wherein the manipulator terminal is capable of receiving image information captured by the underwater camera from the miniature unmanned aerial vehicle and displaying the image information on display means of the manipulator terminal.

With a configuration arranged so that images captured by the underwater camera can be displayed on the manipulator terminal, it becomes possible for the manipulator to adjust the miniature unmanned aerial vehicle (underwater camera) to a desired position and an orientation while observing images in water.

In addition, a configuration may be such that the underwater camera is equipped with a plurality of screw propellers, and the underwater camera is capable of changing an image capturing direction of the underwater camera in water by controlling a rotating speed and a rotational rate of each of the screw propellers, according to a signal from the miniature unmanned aerial vehicle.

The miniature unmanned aerial vehicle and the underwater camera are connected by the signal line, and the underwater camera is separately equipped with means for changing its image capturing direction; thereby, for example, the manipulator can control the image capturing direction in water more flexibly through wireless communication with the miniature unmanned aerial vehicle.

In addition, a configuration may be such that the winding machine is capable of delivering and winding a plurality of the string-like members at the same time, the string-like members are connected to the underwater camera with a given interval therebetween, and the string-like members are pulled downward by weight of the underwater camera to keep a relative positional relation between an image capturing direction of the underwater camera and a heading azimuth of the miniature unmanned aerial vehicle.

The string-like members are connected to the underwater camera with a given interval therebetween; owing to this, when the azimuth of the miniature unmanned aerial vehicle changes and these string-like members twist in the corresponding direction, the underwater camera turns by its own weight in an untwisting direction (it turns in a direction to keep a relative positional relation between the heading azimuth of the miniature unmanned aerial vehicle and the capturing direction of the underwater camera). Having such a simple structure makes it possible for the manipulator to orient the underwater camera toward a desired image capturing direction only by manipulating the miniature unmanned aerial vehicle in an ordinary way.

In addition, a configuration may be such that the underwater camera is equipped with an angular velocity sensor and a pumping mechanism placed in a bottom of the underwater camera, the pumping mechanism includes an intake and a propeller to suck up fluid from downward, a plurality of discharge outlets to discharge sucked-up fluid in a horizontal direction, and valve elements to make the underwater camera turn horizontally to any direction by controlling flow rates of fluid to be discharged from the respective discharge outputs, and the underwater camera automatically operates the valve elements according to a signal indicating an azimuth change from the miniature unmanned aerial vehicle to keep a relative positional relation between an image capturing direction of the underwater camera in a horizontal direction and a heading azimuth of the miniature unmanned aerial vehicle.

The miniature unmanned aerial vehicle and the underwater camera are connected by the signal line and the underwater camera is separately equipped with means for changing its image capturing direction; thereby, the underwater camera can make its image capturing direction relatively coincide with the heading azimuth of the miniature unmanned aerial vehicle according to a signal from the miniature unmanned aerial vehicle. This enables the manipulator to orient the underwater camera toward a desired direction only by manipulating the miniature unmanned aerial vehicle in an ordinary way. Furthermore, when the pumping mechanism sucks up fluid from downward, the underwater camera is pulled downward by its reaction. By adjusting fluid to be discharged from the respective discharge outlets to a flow rate at which the fluid flows balance one another in a horizontal turning direction, it is possible to stabilize the under camera position in a circumferential direction. Hence, by making a configuration such that the pumping mechanism operates all the time in water, it is possible to make the position and image capturing direction of the underwater camera in water more stable.

In addition, a configuration may be such that a first float member floatable on a water surface is placed between the miniature unmanned aerial vehicle and the underwater camera along a longitudinal direction of the string-like member.

Since the first float member is placed between the miniature unmanned aerial vehicle and the underwater camera, the underwater camera immersed under a water surface will be supported, suspended from the first float member floating on the water surface. This makes it possible to keep distance of the underwater camera from the water surface constant. Moreover, for example, by making the string-like member slack moderately, even in a case where it is hard to stabilize the miniature unmanned aerial vehicle in a still position in the air, it is possible to reduce its influence on the position and the image capturing direction of the underwater camera.

It is also preferable that the first float member is provided with a fin part which is immersed under a water surface under its bottom, and when the first float member is towed by the miniature unmanned aerial vehicle on the water surface, supposing that an end of the fin part, facing forward in a direction of movement, is a forward end and an opposite end of the fin part is a rear end, an upper surface of the fin part slants downward from the rear end to the forward end.

When the first float member moves on water surface, towed by the miniature unmanned aerial vehicle, the first float member is not pulled sideways, but will be pulled obliquely upward toward the miniature unmanned aerial vehicle. For this reason, the first float member has a characteristic that it is liable to bounce up above water when it experiences water resistance. The first float member has the fin part which is immersed under a water surface and the fin part is formed such that its upper surface slants downward toward a direction of movement; thereby, the fin part produces force that pulls the first float member downward when the first float member moves on the water surface. This helps to prevent the first float member from bouncing up above water when the first float member moves on the water surface.

In addition, a configuration may be such that the apparatus further includes a second float member floatable on a water surface, with the underwater camera accommodated therein, wherein a lens part of the underwater camera is exposed outside the second float member or at least a part of the second float member is made of a transparent material, thereby making the underwater camera capable of capturing mages in water.

Since the underwater camera is accommodated inside the second float member, it becomes possible to capture images in water from vicinity of a water surface without making the miniature unmanned aerial vehicle itself land on the water surface. Furthermore, for example, by ma king the string-like member slack moderately, even in a case where it is hard to stabilize the miniature unmanned aerial vehicle in a still position in the air, it is possible to reduce its influence on the position and the image capturing direction of the underwater camera.

In addition, since the second float member accommodates the underwater camera inside it and its structure allows the underwater camera oriented downward to capture images in water from inside the second float member, it is hard to provide the second float member with a fin part under its bottom like the first float member. In a configuration of the apparatus that is equipped with the first float member having the fin part and the second float member, the second float member moves, following the first float member, and therefore, the second float member will be towed sideways by the first float member. Thereby, not only the first float member but the second float member can also be prevented from bouncing up above water.

It is also preferable that the underwater camera is supported by an attitude stabilizer which stabilizes an image capturing direction of the underwater camera inside the second float member.

Since the second float member floats on a water surface, it is susceptible to weltering of waves on the water surface. The underwater camera is supported by the attitude stabilizer inside the second float member; this enables it to reduce the influence of the second float member weltering on a water surface on image capturing.

In addition, a configuration may be such that the attitude stabilizer is capable of changing the image capturing direction of the underwater camera according to instructions from the miniature unmanned aerial vehicle.

By making the attitude stabilizer capable of changing the image capturing direction of the underwater camera inside the second float member, it becomes possible to control the image capturing direction of the underwater camera more flexibly.

Advantageous Effects of Invention

As described in the foregoing, according to the underwater image capturing apparatus pertaining to the present embodiment, it becomes possible to control the image capturing position and direction in water easily and flexibly through the use of a miniature unmanned aerial vehicle equipped with a plurality of rotors.

DESCRIPTION OF EMBODIMENTS

In the following, embodiments of an underwater image capturing apparatus pertaining to the present invention will be described in detail with the aid of the drawings. Every underwater image capturing apparatus pertaining to each of embodiments described below is an apparatus that flies to a given position above water, make an underwater camera descend in that position, and capture images in water, as commanded by its manipulator. Now, as places where an underwater image capturing apparatus of the present invention can be used, for example, seas, lakes, rivers, water reservoirs, aquatic reservoirs, pools, etc. are conceivable; however, the apparatus can be used in any other place that is a space where water (liquid) is stored.

First Embodiment

Figure 1:
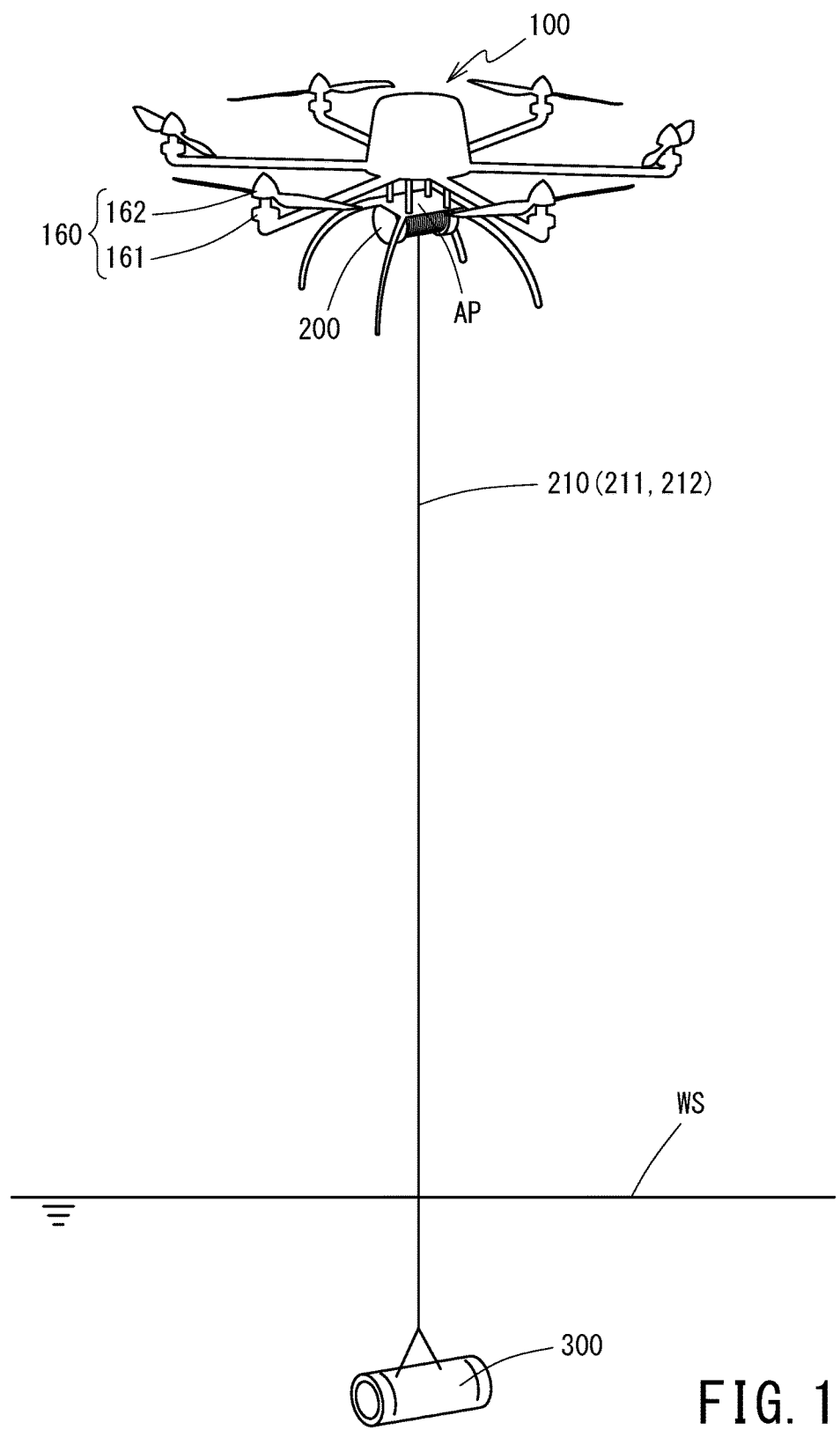
FIG. 1 is a schematic diagram depicting an appearance in which an underwater image capturing apparatus of a first embodiment captures images in water.

FIG. 1 is a schematic diagram depicting an appearance in which an underwater image capturing apparatus 91 pertaining to a first embodiment of the present invention captures images in water. The underwater image capturing apparatus 91 is comprised mainly of a multicopter 100 (a miniature unmanned aerial vehicle) equipped with a plurality of rotors 160 (rotary wings), a winch 200 (a winding machine) fixed to an adapter plate AP of the multicopter 100, an underwater camera 300 capable of capturing images in water. Now, a "rotor" termed in the present invention means a motor 161 with a blade 162 installed thereon.

The multicopter 100 according to the present embodiment is a hexacopter equipped with six rotors 160. The number of the rotors 160 of the multicopter 100 is not limited to six, and the multicopter may be configured to be a tricopter (with three rotors), a quadcopter (with four rotors), or an octocopter (with eight rotors) depending on required flight performance, reliability against failure, allowable cost, etc. The adapter plate AP allows various accessories to be attached to the multicopter 100 depending on a purpose of flight and is a component for simply enhancing the general versatility of the multicopter 100; so, the adapter plate AP may be dispensed with if the winch 200 can be fixed directly to the main body of the multicopter 100.

The underwater camera 300 in the present embodiment is supported, suspended by a wire 210 (string-like member) wound on the winch 200. When the multicopter 100 arrives at a given position on water, the winch 200 delivers the wire 210 to immerse the underwater camera 300 in water. A biforked forward end of the wire 210 is connected to an upper surface of the underwater camera 300 and the underwater camera 300 is supported by the wire 210 to be always oriented toward a horizontal direction.

Figure 2:
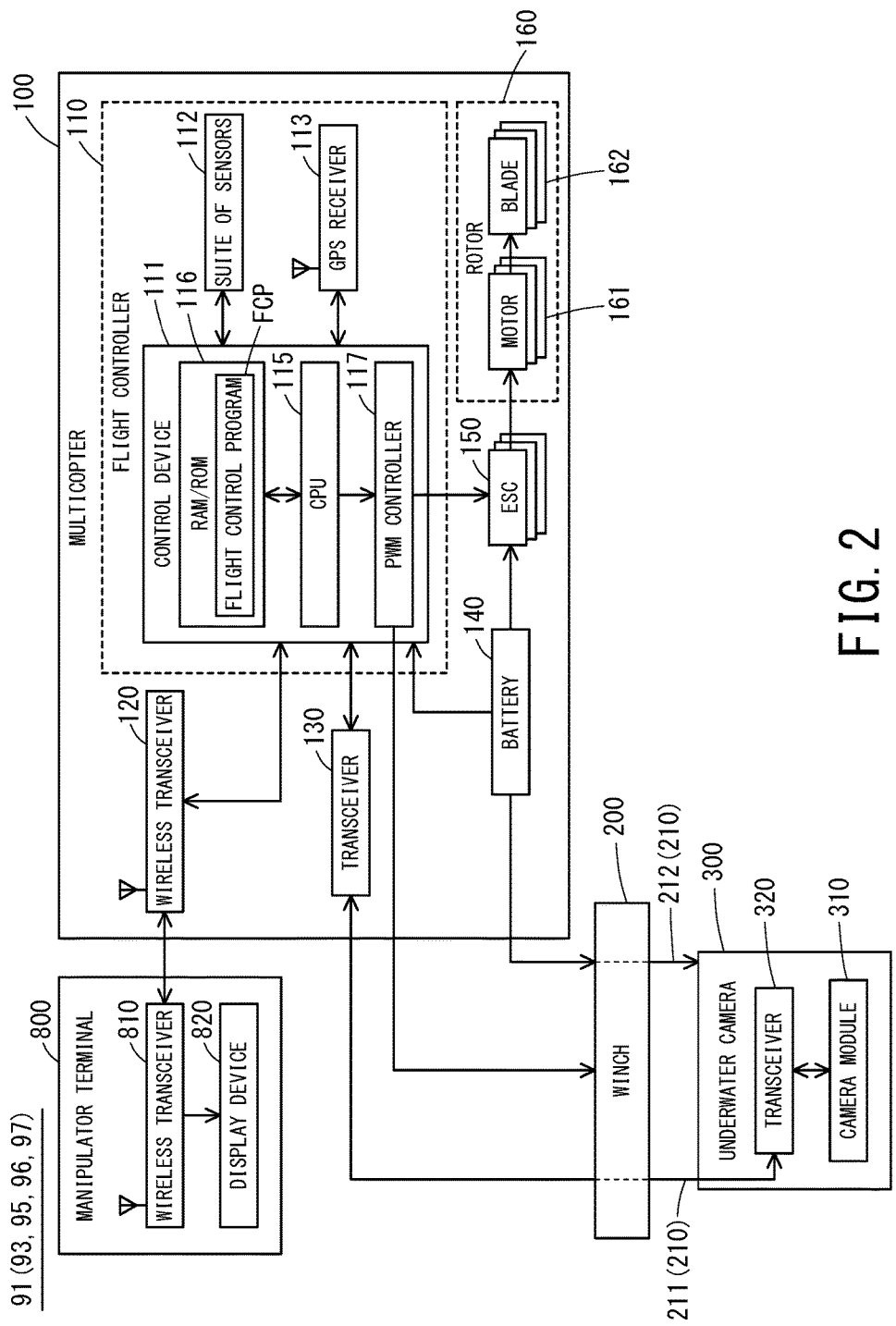
FIG. 2 is a block diagram depicting a functional configuration of the underwater image capturing apparatus of the first embodiment.

FIG. 2 is a block diagram depicting a functional configuration of the underwater image capturing apparatus 91 pertaining to the first embodiment. The multicopter is comprised mainly of a plurality of rotors 160 (six rotors in the present embodiment) which rotate to generate lift for the airframe by rotating the blade 162, a flight controller 110 which integrally manages operation of the respective rotors 160 and controls the attitude and flying motion of the multicopter airframe in air, a wireless transceiver 120 for wireless communication with the manipulator (a manipulator terminal 800), and a battery 140 to supply power to these components.

As described above, each rotor 160 is comprised of the motor 161 and the blade 162. The motor 161 is an outer rotor type DC brushless motor and the blade 162 is installed on its output shaft. The flight controller 110 includes a control device 111 which is a microcontroller. The control device 111 includes a CPU 115 which is a central processing unit, a RAM/ROM 116 which is a storage device, and a PWM controller 117 which controls the rotating speed and rotational rate of each motor 161 in conjunction with ESCs 150 (Electronic Speed Controllers).

The flight controller 110 is also equipped with a suite of sensors 112 and a GPS receiver 113 (GPS), which are connected to the control device 111. In the suite of sensors 112 of the multicopter 100 according to the present embodiment, at least an acceleration sensor, an angular velocity sensor (a gyroscope sensor), an atmospheric pressure sensor (an altitude sensor), and a geomagnetic sensor (an electronic compass) (a direction sensor) are included. Since the multicopter 100 is equipped with the GPS receiver 113 and the geomagnetic sensor, it is possible to specify a position and an orientation of the multicopter 100 using latitude/longitude which is an absolute guidepost and a direction. In addition, while altitude of the multicopter 100 can also be acquired by the GPS receiver 113, the atmospheric pressure sensor is also provided separately as the altitude sensor in the present embodiment.

The configuration described above makes it unnecessary for the manipulator to make the multicopter fly to a position at which the underwater camera 300 is to be immersed while piloting the multicopter 100 visually and the manipulator can immerse the underwater camera 300 at a desired position by specifying minimum necessary parameters. Moreover, it is possible to keep the camera at that position automatically.

The depth to which the underwater camera 300 is to be immersed under a water surface WS is adjusted by the manipulator visually using a display device 820 (to be described later) of the manipulator terminal 800; besides, it is also possible to make an adjustment to a desired depth automatically by measuring the length of the wire 210 delivered by the winch 200 with a rotary encoder which is not depicted and acquiring a hovering altitude with the atmospheric pressure sensor.

In the RAM/ROM 116 of the control device 111, a flight control program FCP is stored in which a flight control algorithm is programmed to control attitude and basic flying operations during a flight of the multicopter 100. According to a command by the manipulator, the flight control program FCP causes the multicopter 100 to fly while adjusting the rotating speed and rotational rate of each rotor 160 and correcting disturbed attitude based on information acquired from the suite of sensors 112. Instructing the multicopter 100 to fly may be performed manually by the manipulator, using a Propo (the manipulator terminal 800). Alternatively, with parameters such as latitude/longitude, altitude, and a flight route which should be specified in advance, the program FCP may cause the multicopter 100 to fly automatically.

The winch 200 is equipped with a drive source which is not depicted and performs delivering and winding of the wire 210 according to instructions from the PWM controller 117 of the control device 111. In addition, electric power to drive the winch 200 is supplied from the battery 140 of the multicopter 100.

In the underwater image capturing apparatus 91 of the present embodiment, the control device 111 in the flight controller 110 also functions to control the winch 200 to simplify the configuration; however, an alternative configuration to separate the control function of the winch 200 is also possible such that the multicopter 100 is separately equipped with a dedicated control device only for the winch 200 or that the winch 200 itself is equipped with a control device. Of course, a configuration is also possible such that the winch 200 is equipped with a battery independently. In addition, instructing the winch 200 to deliver and wind the wire 210 may be performed manually by the manipulator, using the Prop (the manipulator terminal 800) or performed automatically by a program conditional upon, e.g., latitude/longitude, time, etc. Now, the winch 200 is not a requisite component and can be dispense with in a case where the wire 210 is short.

A signal line 211 for transmitting and receiving a signal between the multicopter 100 and the underwater camera 300 is combined with the wire 210 from the winch 200. The signal line 211 is communicably connected to the control device 111 via a transceiver 130 of the multicopter 100 and communicably connected to a camera module 310 via a transceiver 320 of the underwater camera 300.

The multicopter 100 and the underwater camera 300 are connected by the signal line 211 and this makes it possible to transmit a command (e.g., a command to start or stop image capturing and recording or a command to modifying an image capturing parameter such as zoom) to the underwater camera 300 through wireless communication with the multicopter 100 and likewise to receive image information captured by the underwater camera 300 through wireless communication with the multicopter 100.

The manipulator terminal 800 is equipped with a display device 820 (display means) to display images captured by the underwater camera 300 and this enables the manipulator to adjust the position and orientation of the multicopter 100 (the underwater camera 300) while observing images in water captured by the underwater camera 300 in real time.

Now, the signal line 211 connecting the multicopter 100 with the underwater camera 300 is not a requisite component. For instance, in a case where it is not required to observe images in real time, but simply recording an image in water in a given position at a given time is required, the signal line 211 combined with the wire 210 may be dispensed with.

A feeder 212 to supply power from the battery 140 of the multicopter 100 to the underwater camera 300 is also combined with the wire 210 of the winch 200. Power consumed by the underwater camera 300 is generally smaller as compared with power consumed by the multicopter 100 and it is possible to supply sufficient power even with a feeder having a small wire diameter. The feeder 212 is combined with the wire 210 and this makes it unnecessary to install a battery in the underwater camera 300; for example, such an accident is prevented that image capturing is stopped by a human error when a battery in the underwater camera 300 is charged or installed. Now, a configuration is also possible such that the underwater camera 300 is equipped with a battery.

As will be appreciated from the foregoing, the underwater image capturing apparatus 91 of the present embodiment is configured to make the underwater camera 300 descend from the multicopter 100 with high maneuverability by the winch 200 and capture images in water; thereby, image capturing in a remote site using wireless communication and autonomous flying becomes possible and it is possible to control the position and orientation of the underwater camera 300 easily and flexibly.

Second Embodiment

Figure 3:
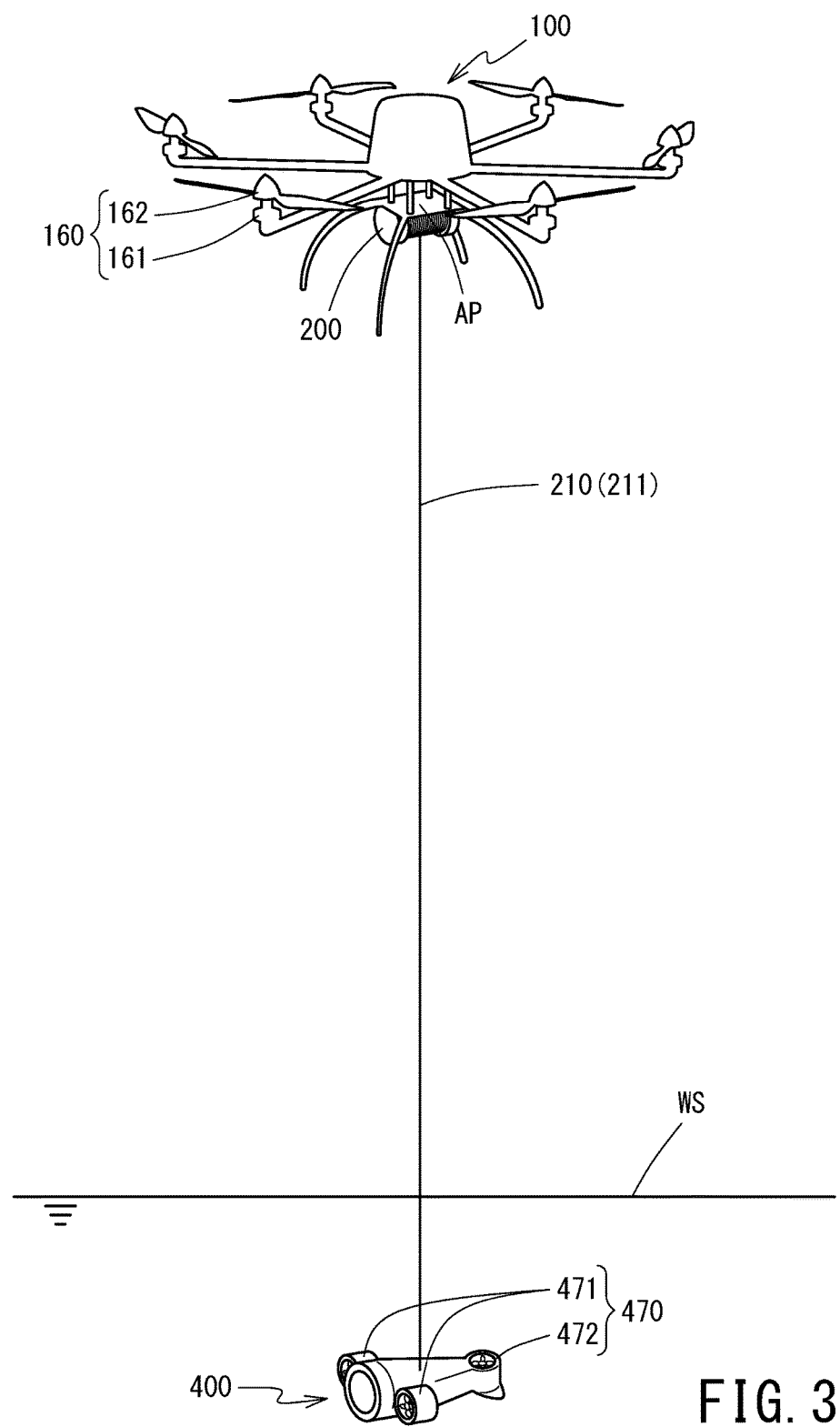
FIG. 3 is a schematic diagram depicting an appearance in which an underwater image capturing apparatus of a second embodiment captures images in water.
Figure 4:
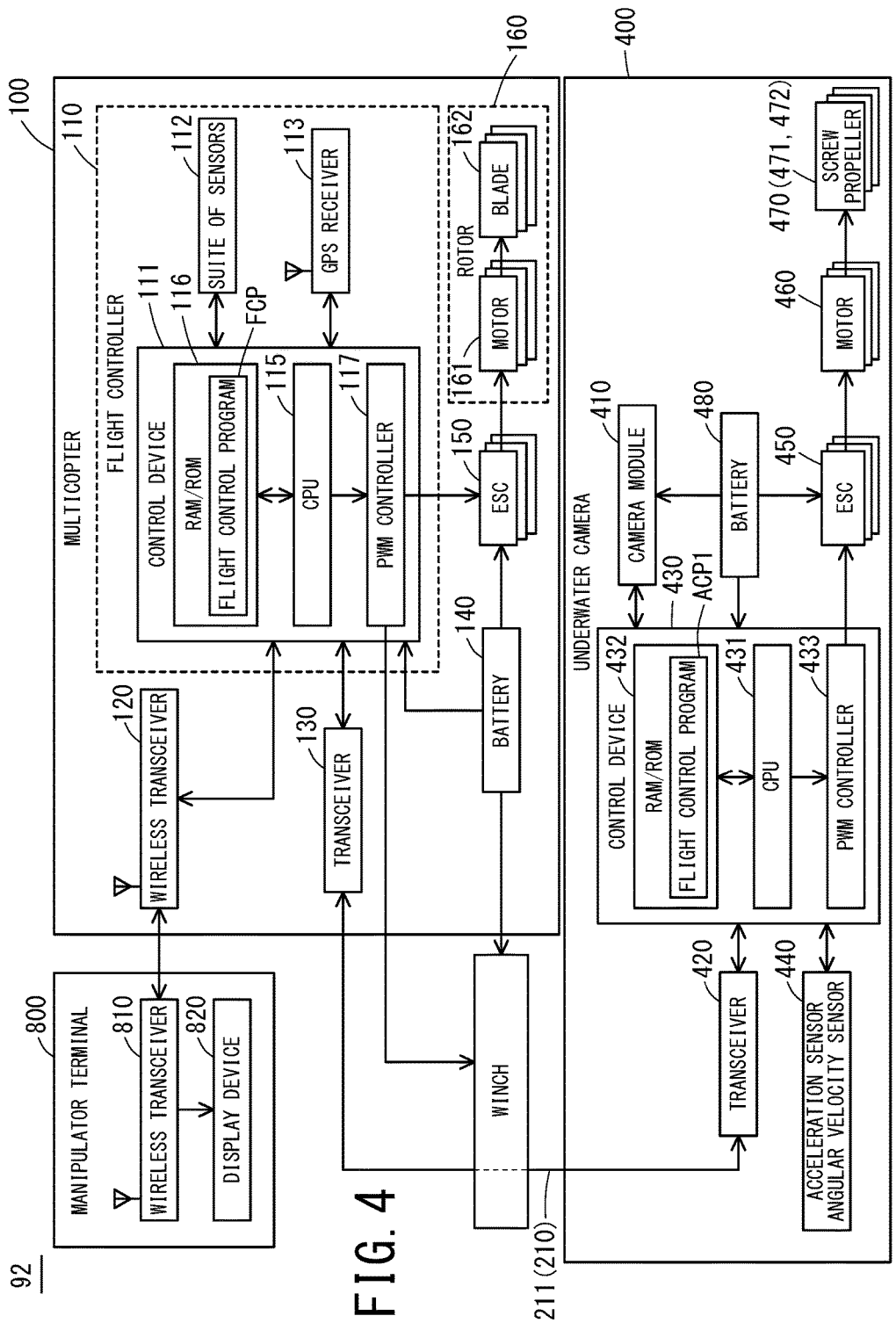
FIG. 4 is a block diagram depicting a functional configuration of the underwater image capturing apparatus of the second embodiment.

Descriptions are provided below about a second embodiment of the underwater image capturing apparatus pertaining to the present invention. FIG. 3 is a schematic diagram depicting an appearance in which an underwater image capturing apparatus 92 pertaining to the second embodiment captures images in water. FIG. 4 is a block diagram depicting a functional configuration of the underwater image capturing apparatus 92. Now, in the following description, a component having a similar or the same function as in the foregoing embodiment is assigned the same reference designator as in the foregoing embodiment and its detailed description is omitted.

An underwater camera 400 according to the second embodiment is comprised mainly of a camera module 410 which captures images in water, a plurality of screw propellers 470 which allows the underwater camera 400 to change its orientation in water, a control device 430 which integrally manages operation of the respective screw propellers 470 and controls attitude of the underwater camera 400 and its image capturing direction in water, a transceiver 420 for communication with the multicopter 100 (and the manipulator terminal 800) through the signal line 211, and a battery 480 to supply power to these components.

As depicted in FIG. 3, the screw propellers 470 are placed on either side and in the rear of the under camera 400 with its lens facing forward. Two screw propellers 471 placed on either side of the underwater camera 400 are thrust sources to make the camera turnable in a horizontal direction and a screw propeller 472 placed in the rear is a thrust source to make the underwater camera 400 tiltable in a vertical direction. The underwater camera 400 is equipped with these screw propellers 470, and thereby, its PTZ motion in water is enabled.

The tilting function of the underwater camera 400 is not a necessary requirement; the screw propeller 472 may be dispensed with, for instance, in a case where image capturing only in a horizontal direction is a purpose or where adjusting a depth to which the underwater camera 400 is to be immersed under water substitutes for a tilting motion. Now, if the screw propeller 472 is to be dispensed with, it is preferable to make the forward end of the wire 210 multi-forked and connect it to an upper surface of the main body of the underwater camera 400, as is the case for the underwater camera 300 in the first embodiment.

The control device 430 of the underwater camera 400 includes a CPU 431 which is a central processing unit, a RAM/ROM 432 which is a storage device, and a PWM controller 433 which controls the rotating speed and rotational rate of each motor 460 in conjunction with ESCs 450.

In the RAM/ROM 432 of the control device 430, an attitude control program ACP1 is stored in which an attitude control algorithm is programmed to control attitude of the underwater camera 400 in water. According to a command by the manipulator (the manipulator terminal 800) received via the multicopter 100, the attitude control program adjusts the rotating speed and rotational rate of each screw propeller 470, thus changing the image capturing direction of the camera. In addition, the control device 430 transmits images captured by the camera module 410 in real time to the manipulator (the manipulator terminal 800) via the multicopter 100.

The underwater camera 400 is further equipped with acceleration and angular velocity sensors 440. Based on information acquired from these sensors 440, the attitude control program ACP1 automatically corrects disturbed attitude of the underwater camera 400 to continue to maintain an image capturing direction specified by the manipulator. Now, this function to maintain an image capturing direction is not a necessary requirement, and the acceleration and angular velocity sensors 440 may be dispensed with, for instance, when environment has little influence on the camera attitude, inter alia, in a case where image capturing is performed in a lake or the like where water is still, or when nothing interferes an operation in which the manipulator manually corrects disturbed attitude while viewing the display device 820 of the manipulator terminal 800.

As will be appreciated from the foregoing, in the underwater image capturing apparatus 92 of the present embodiment, the multicopter 100 and the underwater camera 400 are interconnected by the signal line 211 and the underwater camera 400 is separately equipped with means for changing its image capturing direction; thereby, the manipulator can control the image capturing direction in water more flexibly through wireless communication with the multicopter 100.

In addition, the manipulator does not necessarily need to manipulate the underwater camera 400 separately to turn the underwater camera 400 horizontally. For example, like an underwater camera 500 in a fourth embodiment to be described later, the image capturing direction may automatically be made to relatively coincide with a change in the azimuth of the multicopter 100 accordingly. This enables the manipulator to change the image capturing orientation of the underwater camera 400 in a horizontal direction to a desired direction only by manipulating the multicopter 100 in an ordinary way.

Third Embodiment

Figure 5:
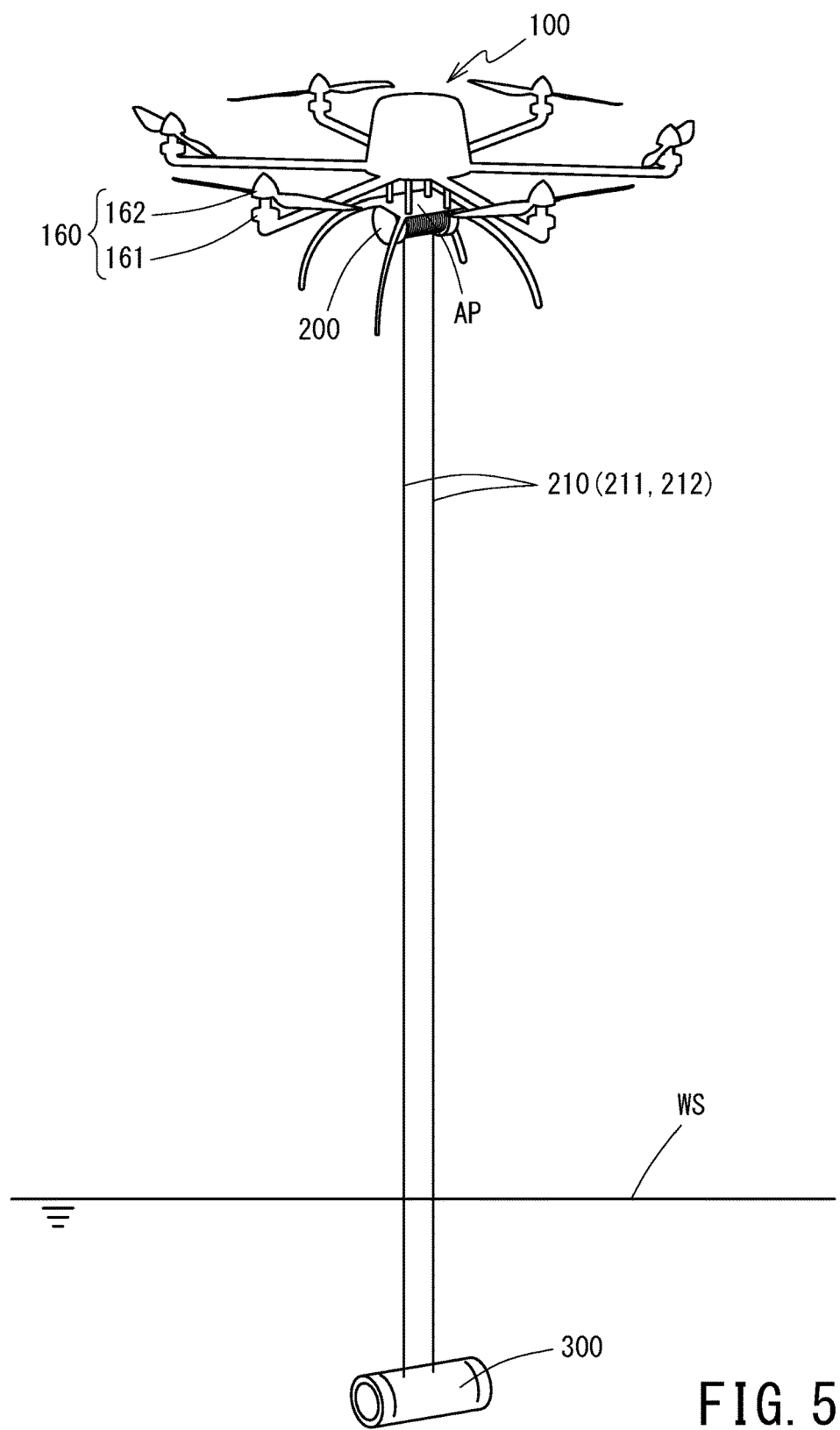
FIG. 5 is a schematic diagram depicting an appearance in which an underwater image capturing apparatus of a third embodiment captures images in water.

Descriptions are provided below about a third embodiment of the underwater image capturing apparatus pertaining to the present invention. FIG. 5 is a schematic diagram depicting an appearance in which an underwater image capturing apparatus 93 pertaining to the third embodiment captures images in water. Now, the underwater image capturing apparatus 93 has the same functional configuration as that of the image capturing apparatus 91 of the first embodiment (FIG. 2). Now, in the following description, a component having a similar or the same function as in the foregoing embodiments is assigned the same reference designator as in the foregoing embodiments and its detailed description is omitted.

The winch 200 in the present embodiment is capable of delivering and winding two wires 210 at the same time and these two wires 210 are connected to an upper surface of the underwater camera 30 with a given interval therebetween. Thereby, when the multicopter 100 yaws and these wires 210 twist in the yawing direction, the underwater camera 300 turns horizontally by its own weight in an untwisting direction.

The underwater image capturing apparatus 93 of the present embodiment has a simple structure, making it possible to keep a relative positional relation between the image capturing direction of the underwater camera 300 in water and the heading azimuth of the multicopter 100. This enables the manipulator to orient the underwater camera 300 toward a desired image capturing direction in a horizontal direction. Now, the signal line 211 and feeder 212 in the present embodiment may be combined with any either of the two wires 210.

Fourth Embodiment

Figure 6:
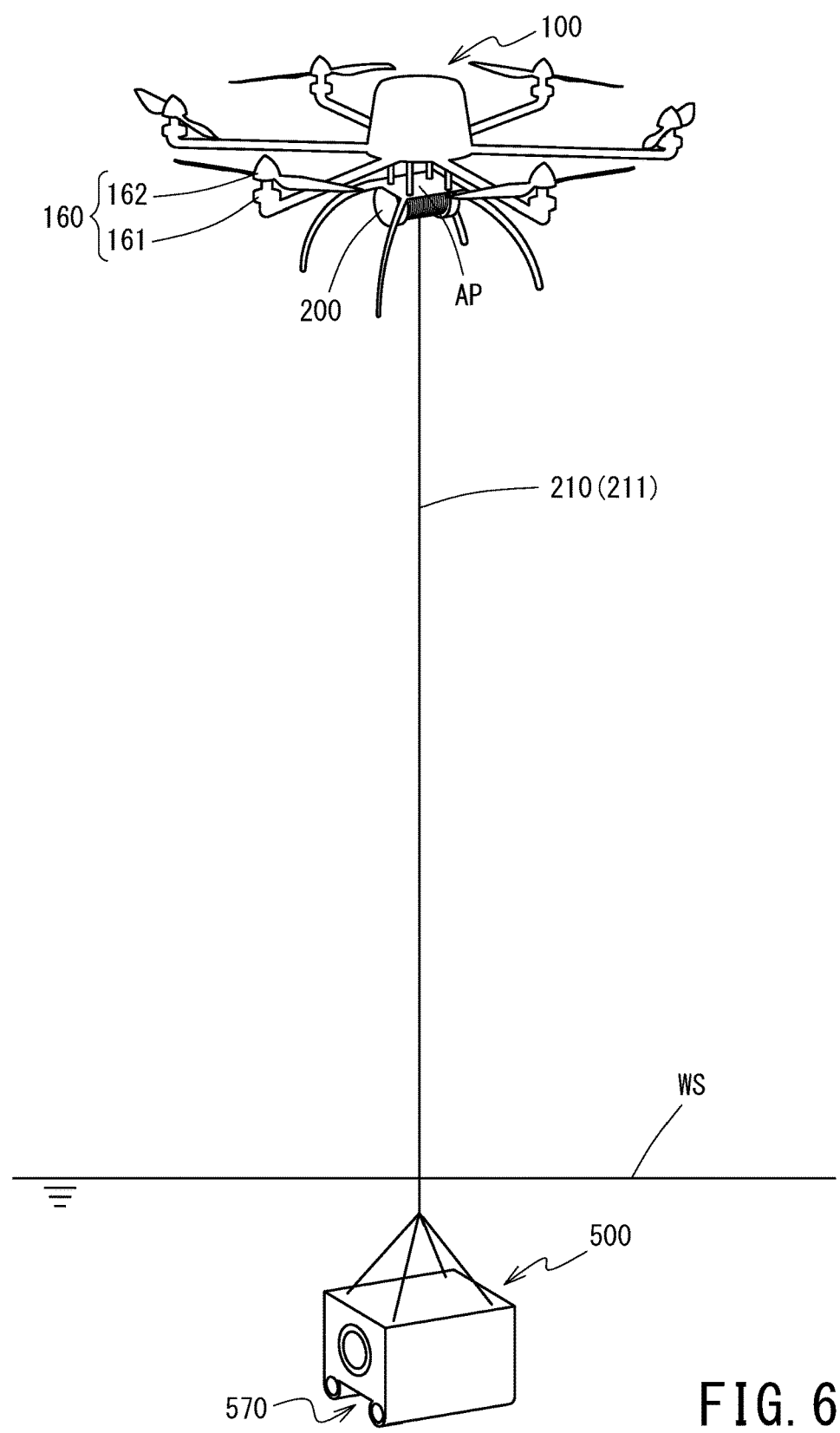
FIG. 6 is a schematic diagram depicting an appearance in which an underwater image capturing apparatus of a fourth embodiment captures images in water.
Figure 7:
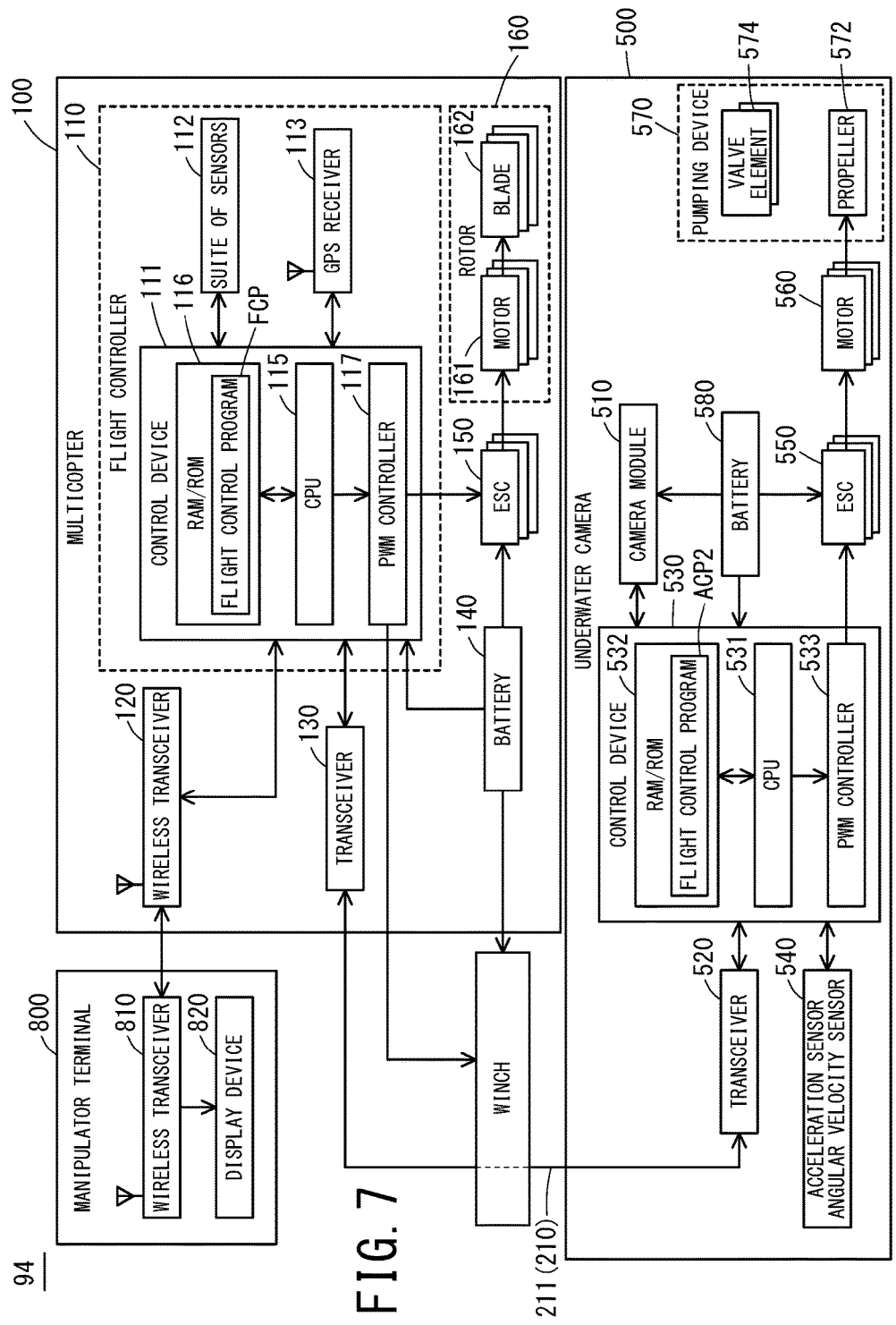
FIG. 7 is a block diagram depicting a functional configuration of the underwater image capturing apparatus of the fourth embodiment.

Descriptions are provided below about a fourth embodiment of the underwater image capturing apparatus pertaining to the present invention. FIG. 6 is a schematic diagram depicting an appearance in which an underwater image capturing apparatus 94 pertaining to the fourth embodiment captures images in water. FIG. 7 is a block diagram depicting a functional configuration of the underwater image capturing apparatus 94. Now, in the following description, a component having a similar or the same function as in the foregoing embodiments is assigned the same reference designator as in the foregoing embodiments and its detailed description is omitted.

The underwater camera 500 according to the fourth embodiment is comprised mainly of a camera module 510 which captures images in water, a pumping device 570 which allows the underwater camera 500 to change its orientation in a horizontal direction in water, a control device 530 which integrally manages operation of respective valve elements 574 to be described later and a propeller 572 in the pumping device 570 and controls the image capturing direction of the underwater camera 500 in water, a transceiver 520 for communication with the multicopter 100 (and the manipulator terminal 800) through the signal line 211, and a battery 580 to supply power to these components.

As depicted in FIG. 6, the underwater camera 500 of the present embodiment is equipped with the pumping device 570 in its bottom. As noted previously, the pumping device 570 is a thrust source to turn the underwater camera 500 in a horizontal direction. A multi-forked forward end of the wire 210 is connected to an upper surface of the underwater camera 500 and the underwater camera 500 is supported by the wire 210 so as to be oriented toward a horizontal direction all the time.

Figure 8:
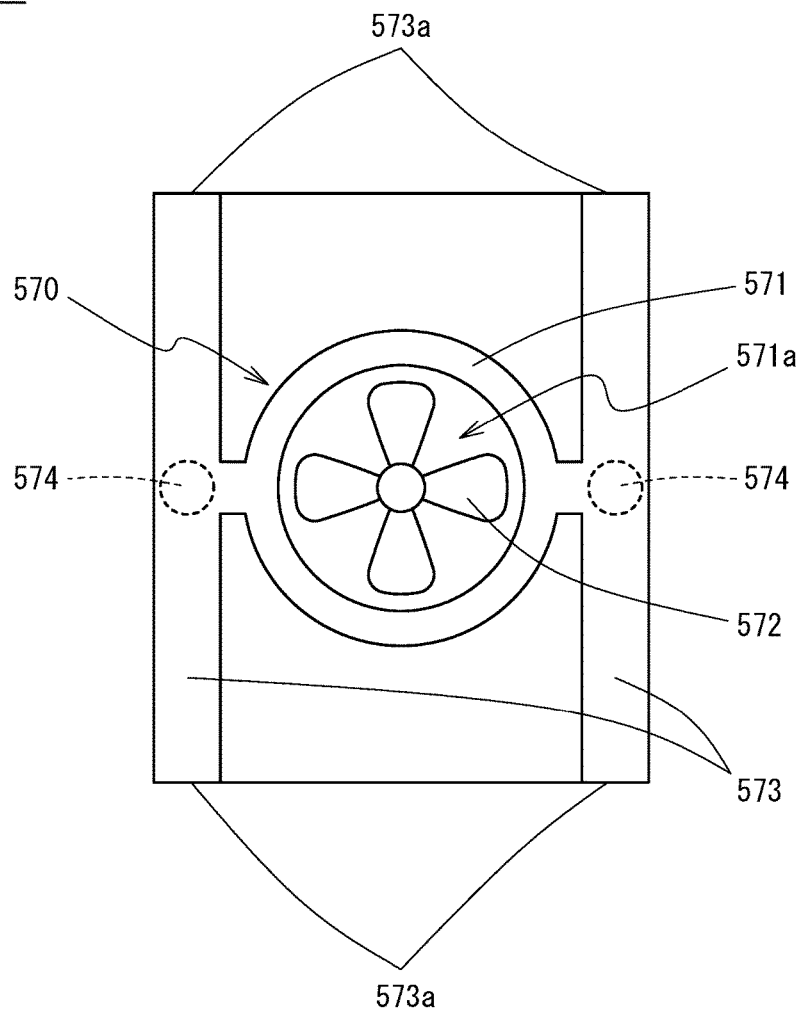
FIG. 8 is a bottom view of a pumping device in the fourth embodiment.

FIG. 8 is a bottom view of the underwater camera 500. The pumping device 570 of the underwater camera 500 is comprised of a hollow pump chamber 571 placed in the center of the bottom of the underwater camera 500, an intake 571a which is an opening to allow the pump chamber 571 to communicate with outside (water), a propeller 572 which is placed near the inlet 571a and takes in fluid (water) into the pump chamber 571, tubular parts 573 which are placed in positions symmetric across the pump chamber 571 and are a pair of T-shaped fluid passages whose branch tubes communicate with the pump chamber 571, four discharge outlets 573a which are open ends of main tubes of the respective tubular parts 573, and valve elements 574 placed at the branching points of the branch tubes inside the respective tubular parts 573. Three motors 560 are accommodated inside the main body of the underwater camera 500 and these motors 560 are connected to the propeller 572 and two valve elements 574 respectively.

When the propeller 572 rotates and fluid is taken into the pump chamber 571, the fluid passes through the respective tubular parts 573 and is discharged from the discharge outlets 573a. The valve elements 574 are control valves which adjust the flow rates of fluid to be discharged from the discharge outputs 753a. As a concrete structure of the valve elements 574, it is expedient to use mixing valves, as found in, e.g., JP H08-121623, with their flow directions inverted.

For the underwater camera 500, its image capturing direction can be turned horizontally to any given direction by unbalancing the flow rates of fluid to be discharged from the respective discharge outlets 573a and further, by adjusting the fluid to be discharged from the respective discharge outlets 573a to a flow rate at which the fluid flows balance one another with respect to a horizontal turning direction, the image capturing direction at that time can be made stable. In addition, when the propeller 572 sucks up fluid, the underwater camera 500 is pulled downward by its reaction. In the present embodiment, the propeller 572 rotates all the time and the fluid to be discharged from the respective discharge outlets 573a flows at a flow rate at which the fluid flows balance one another with respect to a horizontal turning direction, except for when the image capturing direction of the underwater camera 500 is changed. Thereby, the underwater image capturing apparatus 94 according to the present embodiment is contrived to stabilize the image capturing direction of the underwater camera 500.

The control device 530 of the underwater camera 500 includes a CPU 531 which is a central processing unit, a RAM/ROM 532 which is a storage device, and a PWM controller 533 which controls the rotating speed and rotational rate of each motor 560 in conjunction with ESCs 550.

In the RAM/ROM 532 of the control device 530, an attitude control program ACP2 is stored in which an attitude control algorithm is programmed to control attitude of the underwater camera 500 in water. When the multicopter 100 receives a yawing command from the manipulator (the manipulator terminal 800), it transfers that information to the underwater camera 500 as well. Upon receiving the yawing command information, the underwater camera 500 causes the image capturing direction to be oriented toward the same direction as the commanded yawing direction and by the same angle.

More specifically, when the underwater camera 500 receives the above information, the attitude control program ACP2 adjusts the pivoting angle of each valve element 574 in the pumping device 570 so that the underwater camera 500 will turn horizontally in the same direction as the commanded yawing direction. Then, the program turns the underwater camera 500 horizontally by an angle commanded by the multicopter 100 while monitoring the output of the angular velocity sensor 540. After that, the program returns the pivoting angle of each valve element 574 to the original angle and stabilizes the attitude of the underwater camera 500. In addition, the control device 530 transmits images captured by the camera module 510 in real time to the manipulator (the manipulator terminal 800) via the multicopter 100.

As will be appreciated from the foregoing, in the underwater image capturing apparatus 94 of the present embodiment, the multicopter 100 and the underwater camera 500 are interconnected by the signal line 211 and the underwater camera 500 is separately equipped with means for changing its image capturing direction; thereby, the underwater camera 500 can make its image capturing direction relatively coincide with a change in the azimuth of the multicopter 100 accordingly. This enables the manipulator to orient the underwater camera 500 toward a desired image capturing direction only by manipulating the multicopter 100 in an ordinary way.

Fifth Embodiment

Figure 9:
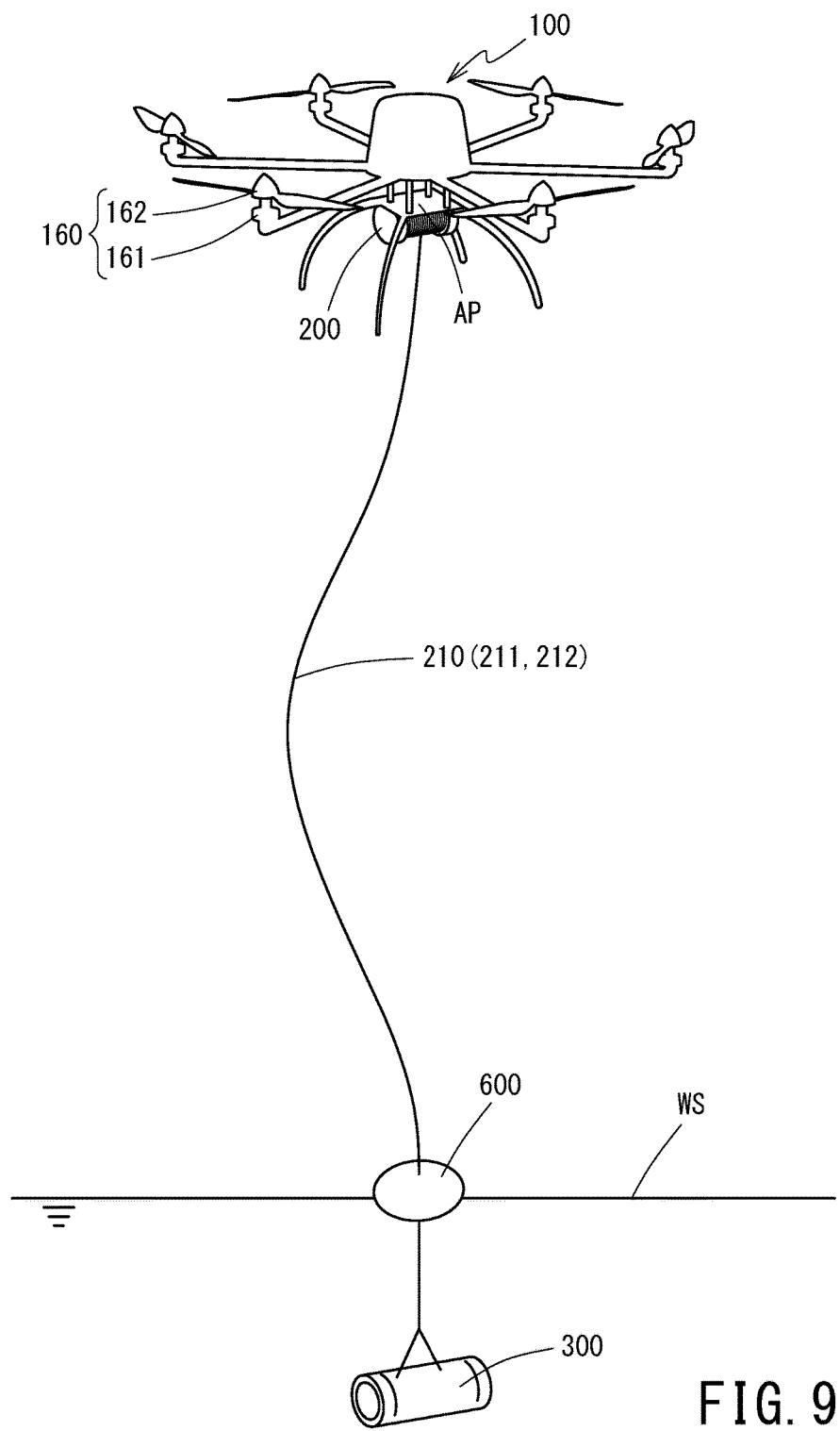
FIG. 9 is a schematic diagram depicting an appearance in which an underwater image capturing apparatus of a fifth embodiment captures images in water.

Descriptions are provided below about a fifth embodiment of the underwater image capturing apparatus pertaining to the present invention. FIG. 9 is a schematic diagram depicting an appearance in which an underwater image capturing apparatus 95 pertaining to the fifth embodiment captures images in water. Now, the underwater image capturing apparatus 95 has the same functional configuration as that of the image capturing apparatus 91 of the first embodiment (FIG. 2). Now, in the following description, a component having a similar or the same function as in the foregoing embodiments is assigned the same reference designator as in the foregoing embodiments and its detailed description is omitted.

On the wire 210 in the present embodiment, a first float member 600 capable of floating on a water surface is placed between the multicopter 100 (the winch 200) and the underwater camera 300 in its longitudinal direction.

Since the first float member 600 is placed between the multicopter 100 and the underwater camera 300, the underwater camera 300 immersed under a water surface will be supported, suspended from the first float member 600 floating on the water surface. This enables it to keep distance of the underwater camera 300 from a water surface constant. Moreover, by making the wire 210 slack moderately as in the present embodiment, even in a case where it is hard to stabilize the multicopter 100 in a still position in the air, it is possible to reduce its influence on the position and the image capturing direction of the underwater camera 300.

Sixth Embodiment

Figure 10:
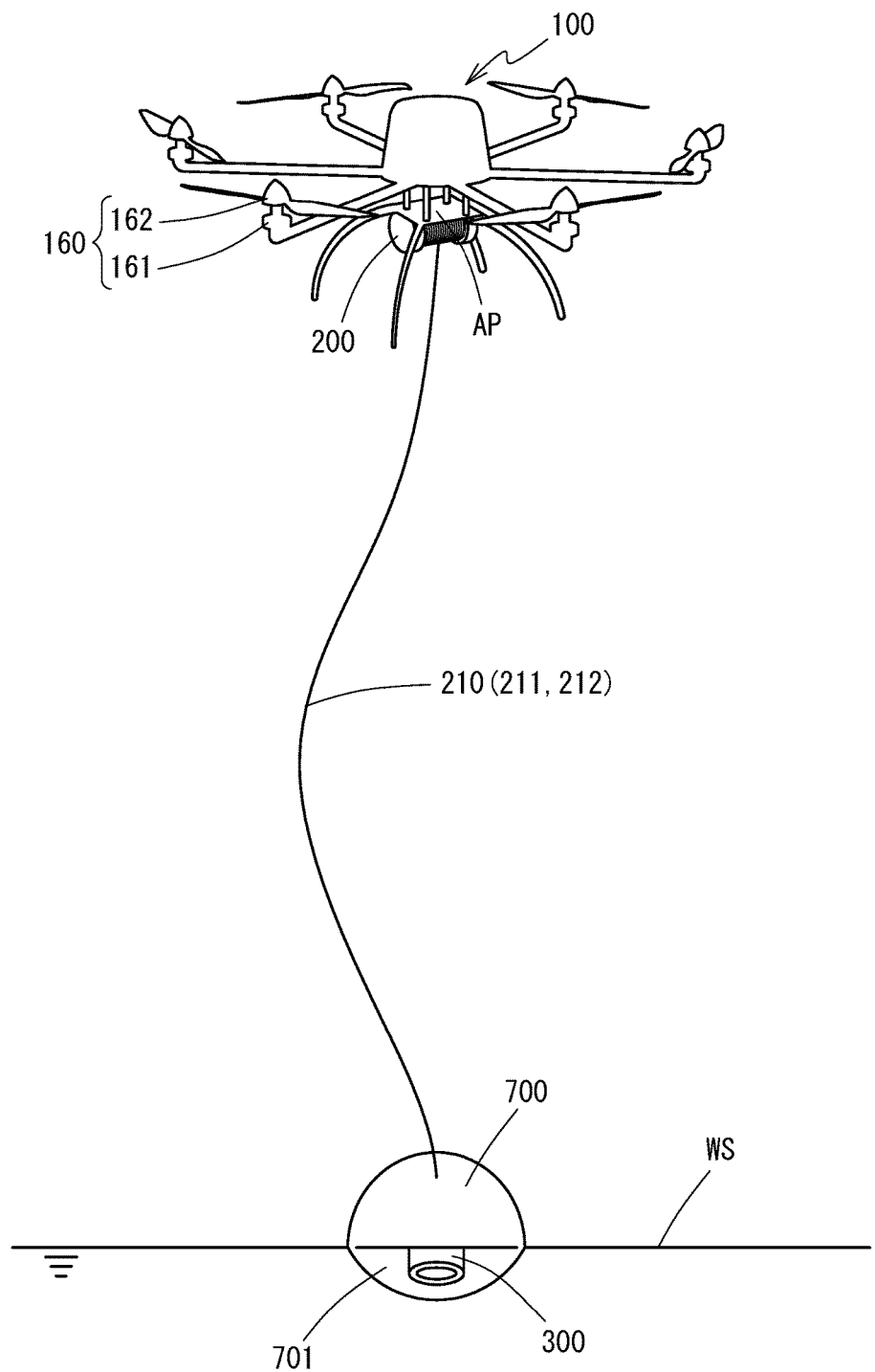
FIG. 10 is a schematic diagram depicting an appearance in which an underwater image capturing apparatus of a sixth embodiment captures images in water.

Descriptions are provided below about a sixth embodiment of the underwater image capturing apparatus pertaining to the present invention. FIG. 10 is a schematic diagram depicting an appearance in which an underwater image capturing apparatus 96 pertaining to the sixth embodiment captures images in water. Now, the underwater image capturing apparatus 96 has the same functional configuration as that of the image capturing apparatus 91 of the first embodiment (FIG. 2). Now, in the following description, a component having a similar or the same function as in the foregoing embodiments is assigned the same reference designator as in the foregoing embodiments and its detailed description is omitted.

The underwater camera 300 according to the present embodiment is accommodated inside a second float member 700 capable of floating on a water surface. A lower half body of the second floating member 700 is formed of a transparent part 701 made of a transparent material, so that the underwater camera 300 can capture images in water through the transparent part 701 from inside the second float member 700. Now, the second float member 700 does not necessarily need to have the transparent part 701; a configuration may be such that a lens part of the underwater camera is exposed outside the second float member if the underwater camera itself has a waterproof structure like the underwater camera 300.

The underwater image capturing apparatus 96 of the present embodiment is thus configured so that the underwater camera 300 can capture images in water while floating on a water surface WS inside the second float member 700. This enables the manipulator to easily capture an image of a scene in water viewed from vicinity of a water surface without making the multicopter 100 itself land on the water surface. Moreover, by making the wire 210 slack moderately as in the present embodiment, even in a case where it is hard to stabilize the multicopter 100 in a still position in the air, it is possible to reduce its influence on the position and the image capturing direction of the underwater camera 300.

Additionally, the underwater camera 300 may be supported by an attitude stabilizer which serves to stabilize the image capturing direction of the underwater camera 300 inside the second float member 700. As a concrete example of the attitude stabilizer, inter alia, a configuration is conceivable in which the underwater camera 300 is, for example, simply suspended by strings from the ceiling of the second float member 700 or a configuration in which the underwater camera 300 is supported by an electric gimbal 710. In a case where the underwater camera 300 is supported by the electric gimbal 710, since it is possible to change the image capturing direction of the underwater camera 300 inside the second float member 700, the image capturing direction of the underwater camera 300 can be controlled more flexibly.

Figure 11:
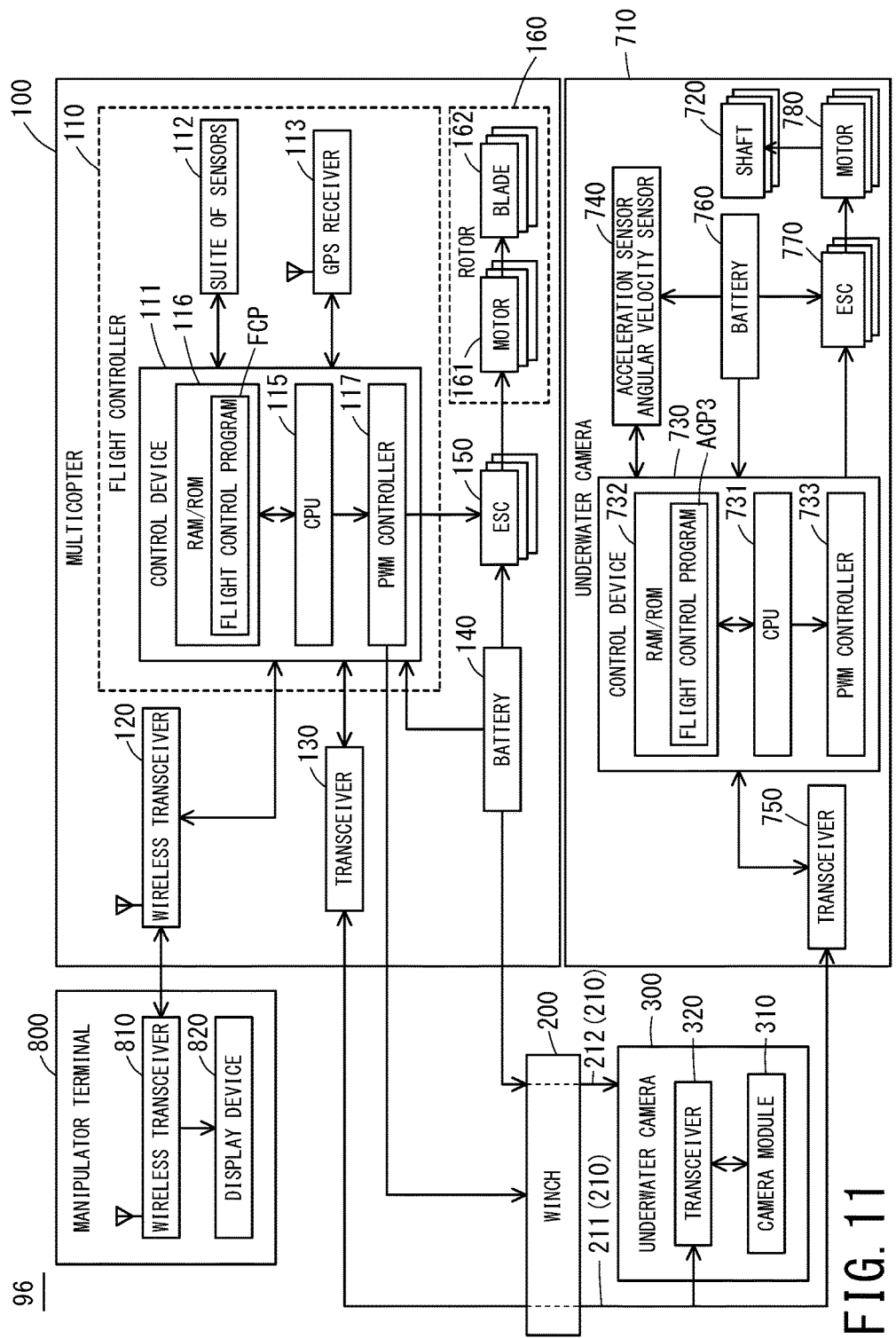
FIG. 11 is a block diagram depicting a functional configuration of the underwater image capturing apparatus of the sixth embodiment.

FIG. 11 is a block diagram depicting a functional configuration of the apparatus wherein the underwater camera 300 is supposed by an electric gimbal 710. The electric gimbal 710 is a triaxial gimbal using a DC brushless motor and is comprised mainly of three shafts 720 which support the underwater camera 300, a plurality of motors 780 which pivot the respective shafts 720, a control device 730 which integrally manages operation of the respective motors 780 and controls the image capturing direction of the underwater camera 300, a transceiver 750 for communication with the multicopter 100 (and the manipulator terminal 800) through the signal line 211, and a battery 760 to supply power to these components.

The control device 730 of the electric gimbal 710 includes a CPU 731 which is a central processing unit, a RAM/ROM 732 which is a storage device, and a PWM controller 733 which controls the rotating speed and rotational rate of each motor 780 in conjunction with ESCs 770.

In the RAM/ROM 732 of the control device 730, an attitude control program ACP3 is stored in which an attitude control algorithm is programmed to control attitude of the underwater camera 300. Based on information acquired from acceleration and angular velocity sensors 740, the attitude control program. ACP3 automatically corrects a disturbed attitude of the underwater camera 300 to continue to maintain an image capturing direction specified by the manipulator. Also, the attitude control program ACP3 drives each motor 780 and changes the image capturing direction of the underwater camera 300, according to a manipulator command (from the manipulator terminal 800) received via the multicopter 100.

Since the second float member 700 floats on a water surface, it is susceptible to weltering of waves on the water surface. The underwater camera 300 is supported by an attitude stabilizer such as an electric gimbal 710 mentioned above inside the second float member 700; thereby, it is possible to reduce the influence of the second float member 700 weltering on the water surface on image capturing. Also, the attitude stabilizer is able to change the image capturing direction of the underwater camera 300 inside the second float member 700; thereby, the image capturing direction of the underwater camera 300 can be controlled more flexibly.

Seventh Embodiment

Figure 12:
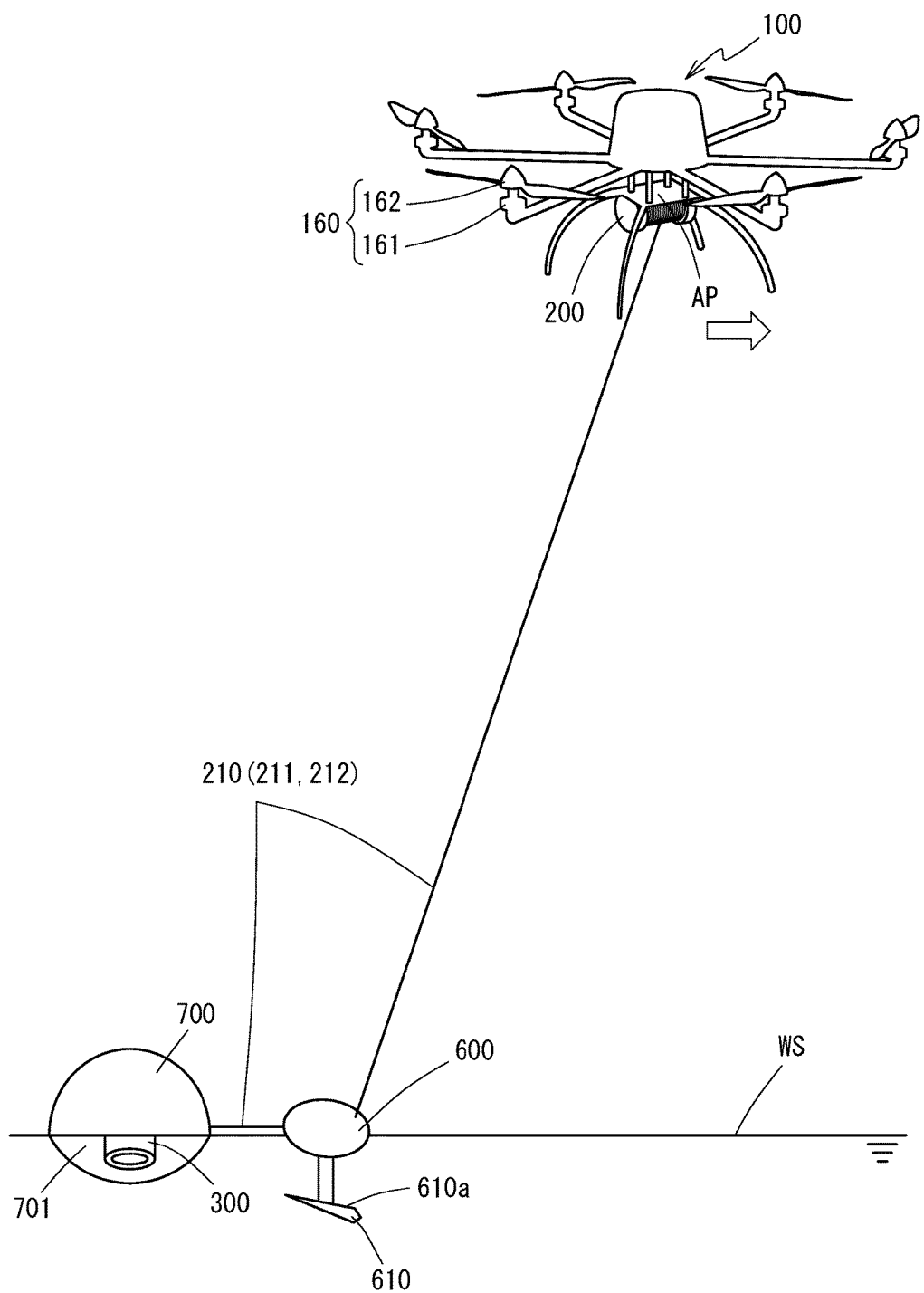
FIG. 12 is a schematic diagram depicting an appearance in which an underwater image capturing apparatus of a seventh embodiment captures images in water.

Descriptions are provided below about a seventh embodiment of the underwater image capturing apparatus pertaining to the present invention. FIG. 12 is a schematic diagram depicting an appearance in which an underwater image capturing apparatus 97 pertaining to the seventh embodiment captures images in water. Now, the underwater image capturing apparatus 97 has the same functional configuration as that of the image capturing apparatus 91 of the first embodiment (FIG. 2) or the image capturing apparatus 96 of the sixth embodiment (FIG. 11). Now, in the following description, a component having a similar or the same function as in the foregoing embodiments is assigned the same reference designator as in the foregoing embodiments and its detailed description is omitted.

The underwater image capturing apparatus 97 according to the present embodiment is equipped with both a first float member 600 and a second float member 700. The first float member 600 with which the underwater image capturing apparatus 97 is equipped is provided with a fin 610 (a fin part) which is immersed under a water surface under its bottom. When the first float member 600 is towed by the multicopter on the water surface, supposing that an end of the fin 610, facing forward in a direction of movement, is a forward end and an opposite end of the fin is a rear end, an upper surface 610*a* of the fin 610 slants downward from its rear end to forward end.

When the first float member 600 moves on the water surface, towed by the multicopter 100, the first float member 600 is not pulled sideways, but will be pulled obliquely upward toward the multicopter 100 flying in the air. Hence, the first float member 600 has a characteristic that it is liable to bounce up above water when it experiences water resistance.

The first float member 600 has the fin 610 which is immersed under a water surface and the fin 610 is formed such that its upper surface 610*a* slants downward toward a direction of movement; thereby, the fin 610 produces force that pulls the first float member 600 downward when the first float member 600 moves on the water surface. This helps to prevent the first float member 600 from bouncing up above water when the first float member 600 moves on the water surface, towed by the multicopter 100.

In addition, the second float member 700 accommodates the underwater camera 300 inside it and the underwater camera 300 captures images in water, facing downward from inside the second float member 700. Hence, it is hard to provide the second float member 700 with the fin 610 under its bottom, like the first float member 600. Since the underwater image capturing apparatus 97 of the present embodiment is equipped with both the first float member 600 having the fin 610 and the second float member 700, the second float member 700 moves, following the first float member 600. That is, the second float member 700 is towed sideways by the first float member 600. Thereby, not only the first float member 600 but also the second float member 700 is prevented from bouncing up above water.

As will be appreciated from the foregoing, the underwater image capturing apparatus 97 of the present embodiment is equipped both the first float member 600 having the fin 610 and the second float member 700; this makes it possible to perform more stable image capturing even when the underwater camera 300 captures images in water while moving on a water surface, towed by the multicopter 100.

While embodiments of the present invention have been described hereinbefore, the present invention is not limited to the foregoing embodiments and can be modified in various ways without departing from the gist of the present invention.

The invention claimed is:

1. An underwater image capturing apparatus comprising:
a multicopter equipped with a plurality of rotors;
an underwater camera capable of capturing images in water; and
a manipulator terminal capable of wireless communication with the multicopter,
wherein the multicopter is adapted such that its airframe attitude in the air and its flying position can be controlled automatically,
the underwater camera and the multicopter are connected by a string-like member which is adapted to serve also as a signal line for transmitting and receiving a signal between the underwater camera and the multicopter, and
the underwater camera is capable of changing its image capturing direction in water, according to a signal from the multicopter.

2. The underwater image capturing apparatus according to claim 1, further comprising a winding machine capable of delivering and winding the string-like member,
wherein the winding machine is fixed to the multicopter.

3. The underwater image capturing apparatus according to claim 1, wherein the multicopter is equipped with a GPS and a direction sensor.

4. The underwater image capturing apparatus according to claim 1, wherein the string-like member is adapted to serve also as a feeder for supplying power from the multicopter to the underwater camera.

5. The underwater image capturing apparatus according to claim 1, wherein the manipulator terminal is capable of receiving image information captured by the underwater camera from the multicopter and displaying the image information on display means of the manipulator terminal.

6. The underwater image capturing apparatus according to claim 1,
wherein the underwater camera is equipped with a plurality of screw propellers, and
the underwater camera is capable of changing an image capturing direction of the underwater camera in water by controlling a rotating speed and a rotational rate of each of the screw propellers, according to a signal from the multicopter.

7. An underwater image capturing apparatus comprising:
a miniature unmanned aerial vehicle equipped with a plurality of rotors; and
an underwater camera capable of capturing images in water,
wherein the miniature unmanned aerial vehicle includes a winding machine capable of delivering and winding a plurality of string-like members at the same time, the string-like members being connected to the underwater camera with a given interval therebetween; and
the string-like members are pulled downward by weight of the underwater camera to keep a relative positional relation between an image capturing direction of the underwater camera and a heading azimuth of the miniature unmanned aerial vehicle.

8. The underwater image capturing apparatus according to claim 1,
wherein the underwater camera is equipped with a pumping mechanism placed in a bottom of the underwater camera,
the pumping mechanism includes an intake and a propeller to suck up fluid from downward, a plurality of discharge outlets to discharge sucked-up fluid in a horizontal direction, and valve elements to make the underwater camera turn horizontally to any direction by controlling flow rates of fluid to be discharged from the respective discharge outputs, and
the underwater camera is capable of changing an image capturing direction of the underwater camera in water by controlling a pivoting angle of the valve elements, according to a signal from the multicopter.

9. The underwater image capturing apparatus according to claim 1, wherein a first float member floatable on a water surface is placed between the multicopter and the underwater camera along a longitudinal direction of the string-like member.

10. The underwater image capturing apparatus according to claim 9,
wherein a fin part which is immersed under a water surface is fixed to a bottom of the first float member; and
when the first float member is towed by the multicopter on the water surface, supposing that an end of the fin part, facing forward in a direction of movement, is a forward end and an opposite end of the fin part is a rear end, an upper surface of the fin part slants downward from the rear end to the forward end.

11. The underwater image capturing apparatus according to claim 1, further comprising a second float member floatable on a water surface, with the underwater camera accommodated therein,
wherein a lens part of the underwater camera is exposed outside the second float member or at least a part of the second float member is made of a transparent material, thereby making the underwater camera capable of capturing mages in water.

12. The underwater image capturing apparatus according to claim 11, wherein the underwater camera is supported by an attitude stabilizer which stabilizes an image capturing direction of the underwater camera inside the second float member.

13. The underwater image capturing apparatus according to claim 12, wherein the attitude stabilizer is capable of changing the image capturing direction of the underwater camera according to instructions from the multicopter.

* * * * *